(12) United States Patent
Zhou

(10) Patent No.: US 11,503,625 B2
(45) Date of Patent: Nov. 15, 2022

(54) METHOD AND APPARATUS FOR TRANSMITTING DATA

(71) Applicant: BEIJING XIAOMI MOBILE SOFTWARE CO., LTD., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 158 days.

(21) Appl. No.: 16/699,492

(22) Filed: Nov. 29, 2019

(65) Prior Publication Data
US 2020/0107355 A1 Apr. 2, 2020

Related U.S. Application Data

(63) Continuation of application No. PCT/CN2017/086574, filed on May 31, 2017.

(51) Int. Cl.
*H04W 4/00* (2018.01)
*H04W 72/12* (2009.01)
(Continued)

(52) U.S. Cl.
CPC ....... *H04W 72/1289* (2013.01); *H04L 1/1819* (2013.01); *H04W 72/042* (2013.01); *H04W 72/0446* (2013.01); *H04W 76/27* (2018.02)

(58) Field of Classification Search
CPC ............ H04W 72/1289; H04W 76/27; H04W 72/042; H04W 72/0446; H04L 1/1819
See application file for complete search history.

(56) References Cited

U.S. PATENT DOCUMENTS

2013/0223295 A1* 8/2013 Choi .................. H04L 1/1635
370/280
2013/0301503 A1 11/2013 Park
(Continued)

FOREIGN PATENT DOCUMENTS

CN 101060699 A 10/2007
CN 101426275 A 5/2009
(Continued)

OTHER PUBLICATIONS

International Search Report of PCT Application No. PCT/CN2017/086574 dated Feb. 23, 2018 with English translation, (12p).
(Continued)

*Primary Examiner* — Siren Wei
(74) *Attorney, Agent, or Firm* — Arch & Lake LLP

(57) ABSTRACT

A method and apparatus are provided for transmitting data. The method includes: acquiring downlink control information of a frame to be scheduled, the downlink control information at least including configuration information of an embedded resource of the frame to be scheduled; scheduling, based on the downlink control information, a downlink information transmission unit to transmit downlink data and uplink allocation information of the frame; and upon a transition latency, acquiring, based on the uplink allocation information, hybrid automatic repeat request (HARQ) feedback information transmitted over the downlink data and uplink data from an uplink information transmission unit. The embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

18 Claims, 11 Drawing Sheets

(51) Int. Cl.
  *H04W 76/27* (2018.01)
  *H04L 1/18* (2006.01)
  *H04W 72/04* (2009.01)

(56) References Cited

U.S. PATENT DOCUMENTS

| | | | |
|---|---|---|---|
| 2014/0086113 | A1 | 3/2014 | Ji et al. |
| 2014/0105158 | A1* | 4/2014 | Kim ................. H04L 1/001 |
| | | | 370/329 |
| 2015/0208382 | A1* | 7/2015 | Yao ................. H04L 5/1469 |
| | | | 370/280 |
| 2015/0271839 | A1 | 9/2015 | She et al. |
| 2017/0111160 | A1 | 4/2017 | Chen et al. |
| 2018/0254851 | A1* | 9/2018 | Roessel ............ H04L 1/1861 |
| 2018/0352582 | A1* | 12/2018 | Yi .................... H04W 74/006 |

FOREIGN PATENT DOCUMENTS

| | | |
|---|---|---|
| CN | 106162656 A | 11/2016 |
| CN | 106255215 A | 12/2016 |
| CN | 106507486 A | 3/2017 |
| CN | 106685603 A | 5/2017 |
| WO | 2017065830 A1 | 4/2017 |

OTHER PUBLICATIONS

First Office Action issued to Chinese Application No. 201780000441.3 dated Sep. 24, 2019 and English translation, (12p).
Extended European Search Report of counterpart EP Application No. 17911806.2 dated Jan. 20, 2021, (11p).

* cited by examiner

METHOD AND APPARATUS FOR TRANSMITTING DATA

CROSS-REFERENCE

This application is a continuation application of International Application No. PCT/CN2017/086574, filed on PCT in May 31, 2017, the contents of all of which are incorporated herein by reference in their entirety.

TECHNICAL FIELD

The present disclosure relates to the technical field of communications, and in particular, relates to a method and apparatus for transmitting data.

BACKGROUND

With the development of wireless communication technologies, mobile communication networks are gradually evolving to 5G, that is, new radio (NR) networks. The 5G networks process greatly enhanced capabilities in such aspects as data transmission rate, coverage, latency, capacity and the like, and may be applied to broadband connections, Internet of things, Internet of vehicles, wide area coverage and the like fields.

With respect to data transmission in the 5G networks, to shorten a transmission latency of a complete data transmission process, the NR system introduces a self-contained mechanism. That is, in one frame structure, one complete data transmission process may be practiced. In the related art, during the practice of one complete downlink data transmission process by using one frame, after each group of downlink data is transmitted, an uplink control information transmission unit needs to be scheduled to transmit hybrid automatic repeated request (HARQ) feedback information transmitted over the just transmitted downlink data. During this period, an uplink-downlink transition latency needs to be defined, such that the system has sufficient time to implement a schedule transition from downlink to uplink. Similarly, during the process of one complete uplink data transmission process by using one frame, firstly a downlink control information transmission unit needs to be scheduled to transmit uplink allocation information to a user equipment (UE). In the frame structure, an uplink-downlink transition latency also needs to be defined, such that the system has sufficient time to implement a schedule transition from downlink to uplink. Afterwards, the UE transmits uplink data by using a group of uplink data transmission units indicated by the uplink allocation information.

SUMMARY

To overcome the problem in the related art, embodiments of the present disclosure provide a method and apparatus for transmitting data to shorten a transmission latency of service data.

In a first aspect, a method for transmitting data is provided. The method is applied to a base station. The method may include: acquiring downlink control information of a frame to be scheduled, the downlink control information comprising configuration information of an embedded resource of the frame to be scheduled; scheduling, based on the downlink control information, a downlink information transmission unit to transmit downlink data and uplink allocation information of the frame; and acquiring, based on the uplink allocation information, hybrid automatic repeat request (HARQ) feedback information about the transmitting of the downlink data transmitted and uplink data from an uplink information transmission unit, upon a transition latency. The embedded resource may include: an uplink allocation resource embedded in the downlink information transmission unit and configured to bear the uplink allocation information; and/or a downlink feedback resource embedded in the uplink information transmission unit and configured to bear the HARQ feedback information about the transmitting of the downlink data.

In a second aspect, an apparatus for use in data transmission is provided, comprising: at least one processor; and a memory for storing instructions executable by the at least one processor. The at least one processor is configured to: acquire downlink control information of a frame to be scheduled, the downlink control information comprising configuration information of an embedded resource of the frame to be scheduled; schedule, based on the downlink control information, a downlink information transmission unit to transmit downlink data and uplink allocation information of the frame; and acquire, based on the uplink allocation information, hybrid automatic repeat request (HARQ) feedback information about the transmitting of the downlink data transmitted and uplink data from an uplink information transmission unit, upon a transition latency. The embedded resource may include: an uplink allocation resource embedded in the downlink information transmission unit and configured to bear the uplink allocation information; and/or a downlink feedback resource embedded in the uplink information transmission unit and configured to bear the HARQ feedback information about the transmitting of the downlink data.

In a third aspect, an apparatus for use in data transmission is provided, comprising: at least one processor; and a memory for storing instructions executable by the at least one processor. The at least one processor is configured to: acquire downlink control information, the downlink control information comprising configuration information of an embedded resource of a frame structure; acquire downlink data and uplink allocation information based on the downlink control information; acquire, transmit hybrid automatic repeat request (HARQ) feedback information about the transmitting of the downlink data and uplink data to a base station over an uplink resource indicated by the uplink allocation information, upon a transition latency. The embedded resource may include: an uplink allocation resource embedded in the downlink information transmission unit and configured to bear the uplink allocation information; and/or a downlink feedback resource embedded in the uplink information transmission unit and configured to bear the HARQ feedback information about the transmitting of the downlink data.

It is to be understood that both the foregoing general description and the following detailed description are exemplary and explanatory only and are intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Figure 1:
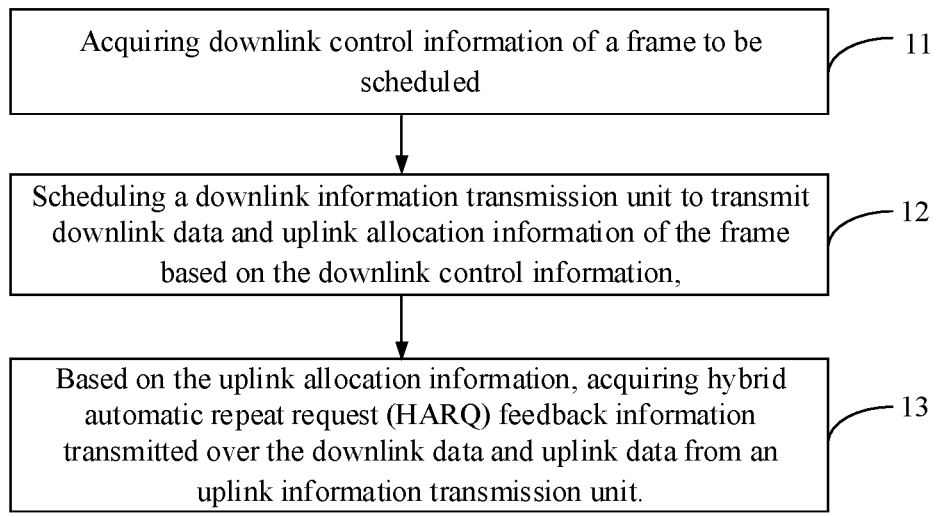
FIG. 1 is a flowchart of a method for transmitting data according to an exemplary embodiment of the present disclosure.

Reference will now be made in detail to exemplary, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

The terms used in the present disclosure are for the purpose of describing particular embodiments only and are not intended to limit the present disclosure. As used in the present disclosure and the appended claims, the singular forms "a", "an" and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms first, second, third, etc. may be used in the present disclosure to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to determining" or "in response to detecting" depending on the context.

The technical solutions according to the present disclosure are suitable for 5G networks. Execution subjects involved in the present disclosure include: a base station and a user equipment (UE), wherein the base station may be a base station or sub-base station equipped with a large-scale antenna array, or may be a micro base station, for example, a user terminal or the like which acts as a temporary base station within a time period. The UE may be a user terminal, a user node, a mobile terminal, a tablet computer or the like. In specific practice, the base station and the UE are independent of each other and are also correlated with each other to collaboratively implement the technical solutions of the present disclosure.

The present disclosure is suitable for the scenario where downlink service data and uplink service data are alternatively transmitted over a data transmission link in the 5G network.

In a time division duplexing (TDD) system in the 5G network, each frame in the data transmission link is formed of basic information transmission units that are arranged in sequence, including an uplink information transmission unit and a downlink information transmission unit. The basic information transmission unit may be a symbol, a slot, a mini-slot or the like. A symbol occupies a shortest time length; a mini-slot may include several symbols, for example, 5 symbols; and the number of symbols included in a slot is slightly greater than the number of symbols included in a mini-slot. For example, a slot is formed by 7 symbols. Therefore, the time length of a slot is slightly longer than that of a mini-slot.

In the embodiments of the present disclosure, uplink information transmission refers to transmitting information from the UE to the base station, and uplink information includes uplink control information (UCI) and uplink service data. The uplink control information at least includes hybrid automatic repeated request (HARQ) feedback information.

Downlink information transmission refers to transmitting information from the base station to the UE, and downlink information includes downlink control information (DCI) and downlink service data. The downlink control information includes uplink and downlink resource schedule information. The uplink resource schedule information includes uplink allocation information for allocating an uplink resource to a target UE.

To overcome the problem in the related art, embodiments of the present disclosure provide a method and apparatus for transmitting data to shorten a transmission latency of service data.

Accordingly, an embodiment of the present disclosure provides a method for transmitting a low-latency service data, applied to a base station. Referring to a flowchart of a method for transmitting data according to an exemplary embodiment as illustrated in FIG. 1, the method may include the following steps:

In step 11, downlink control information of a frame to be scheduled is acquired, wherein the downlink control information at least includes configuration information of an embedded resource of the frame to be scheduled. The embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

The downlink control information of a frame is configured to inform the base station and the UE of allocations of the downlink resource and the uplink resource in the frame, and inform the base station and the UE of a designated position or the like information of the resource for bearing the control information.

The downlink control information may include: the number of downlink information transmission units, configuration information of a transition latency, the number of uplink information transmission units, and configuration information of the embedded resource.

The configuration information of the transition latency includes: a position, a time length or the like of the transition latency in the frame.

The embedded resource includes: an uplink allocation resource embedded in the downlink information transmission unit, and/or a downlink feedback resource embedded in the uplink information transmission unit. The uplink allocation resource is configured to bear allocation information of an uplink resource in the frame; and the downlink feedback resource is configured to bear HARQ feedback information transmitted over downlink data in the frame.

If some information in the downlink control information is predefined in the 5G network protocols. For example, the downlink control information may include the following information:

a length of a frame structure;

a time length of the transition latency;

a time length of the downlink information transmission unit, the number of downlink information transmission units, a position of the transition latency, a time length of the uplink information transmission unit and the number of uplink information transmission units where the length of the frame structure is not changed;

a proportional relationship between the uplink information transmission unit and the downlink information transmission unit where the length of the frame structure is not changed; and configuration information of the embedded resource in an information transmission unit;

Based on whether the above information needs to be configured in real time, the base station may acquire the downlink control information in at least one of the following ways:

a first way: acquiring the downlink control information from a system broadcast signaling;

a second way: acquiring the downlink control information from a Radio Resource Control (RRC) upper-layer control signaling; and a third way: acquiring the downlink control information from a downlink control information transmission unit at a head of the frame; wherein the third way is particularly applicable to the scenario where the above control information needs to be configured in real time.

In one or more embodiments of the present disclosure, before the base station employs the above frame structure, the downlink control information mainly acquired includes the configuration information of the embedded resource.

Figure 2A:
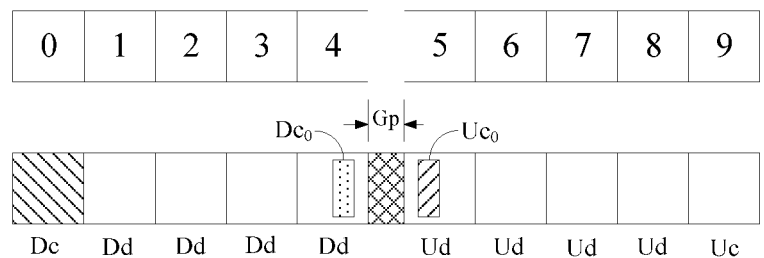
FIG. 2A is a schematic diagram of a frame structure according to an exemplary embodiment of the present disclosure.

In one or more embodiments of the present disclosure, information is transmitted by a new frame structure. Referring to FIG. 2A, a schematic diagram of a frame structure according to an exemplary embodiment is illustrated. The frame structure includes: several downlink information transmission units, a transition latency Gp, several uplink information transmission units. For example, the downlink information transmission units may include a downlink control information transmission unit Dc and a downlink data transmission unit Dd. And the uplink information transmission units may include an uplink data transmission unit Ud and an uplink control information transmission unit Uc.

That is, in the present disclosure, a frame of the data link may simultaneously implement downlink information transmission and uplink information transmission, including: transmission of downlink control information, downlink service data, uplink control information and uplink service data.

Figure 3A:
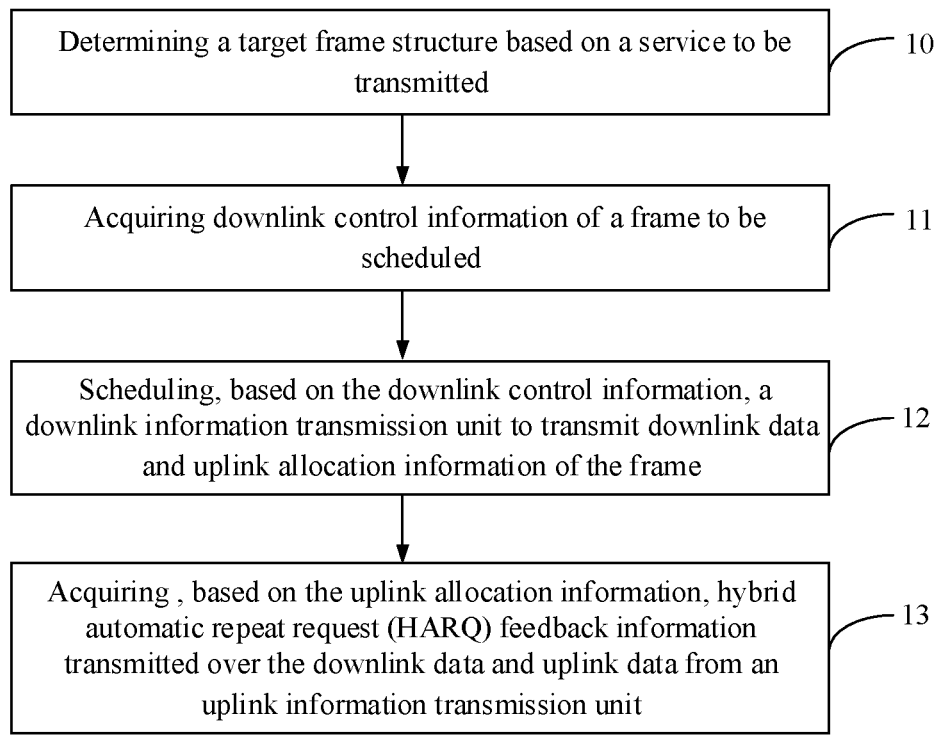
FIG. 3A is a flowchart of another method for transmitting data according to an exemplary embodiment of the present disclosure.

Referring to a flowchart of another method for transmitting data according to an exemplary embodiment as illustrated in FIG. 3A, in another embodiment of the present disclosure, prior to step 11, the method may further include the following step:

In step 10, a target frame structure is determined based on a service to be transmitted, wherein the target frame at least includes: a downlink data transmission unit, a transition latency, and an uplink data transmission unit.

That is, the frame structure as illustrated in FIG. 2A is not a default frame structure in the system, and needs to be selected based on the type of a network accessed by the UE and/or the type of a service to be transmitted of the UE.

In the present disclosure, selection of the above target frame structure may involve two cases:

In a first case, the target frame structure is determined based on the type of the access network of the UE.

Figure 3B:
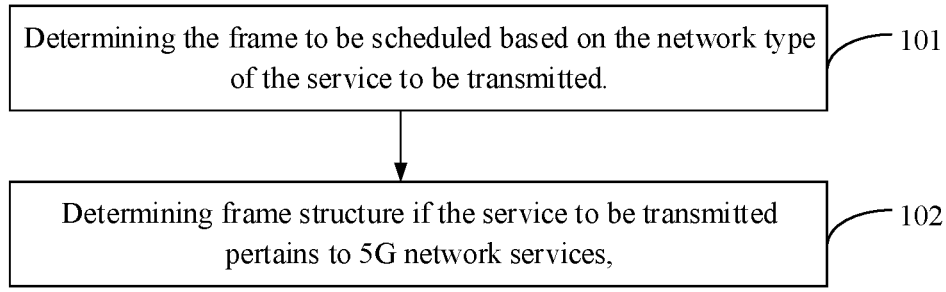
FIG. 3B is a flowchart of another method for transmitting data according to an exemplary embodiment of the present disclosure.

Referring to a flowchart of another method for transmitting data according to an exemplary embodiment as illustrated in FIG. 3B, step 10 may include the following steps:

In step 101, the frame to be scheduled is determined based on the network type of the service to be transmitted.

In one or more embodiments of the present disclosure, if the base station supports 3G, 4G and 5G network services simultaneously, the base station may determine the network type of the service to be transmitted based on the type of the network accessed by the UE, such that the corresponding frame structure is scheduled.

In step 102, if the service to be transmitted pertains to 5G network services, the target frame structure is determined.

When the base station determines that service data transmitted to a UE, for example, UE 1, pertains to the 5G service types, that is, the UE 1 currently accesses the 5G network, uplink and downlink service data transmissions may be simultaneously carried out in the target frame which is to be scheduled by the base station, and only one transition from downlink to uplink is needed. That is, the target frame structure determined in step 102 is as illustrated in FIG. 2A.

In a second case, assuming that all the UEs pertain to the 5G network devices, the target frame structure may also be determined based on the data type of the service data to be transmitted.

Figure 3C:
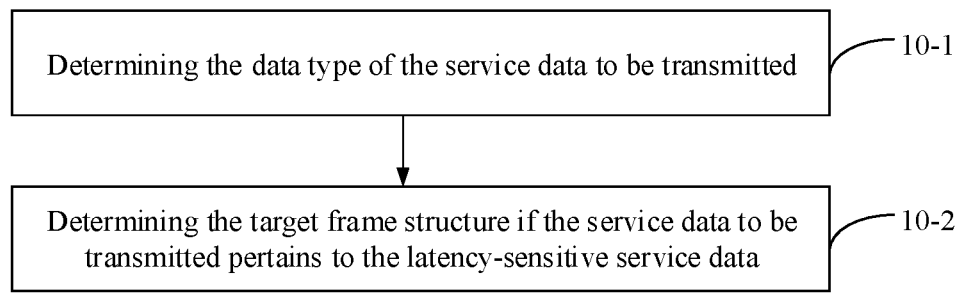
FIG. 3C is a flowchart of another method for transmitting data according to an exemplary embodiment of the present disclosure.

Referring to a flowchart of another method for transmitting data according to an exemplary embodiment as illustrated in FIG. 3C, step 11 may include the following steps:

In step 10-1, the data type of the service data to be transmitted is determined.

In one or more embodiments of the present disclosure, the base station may monitor service requests initiated by various UEs, and determine types of the services to be transmitted based on the service requests of the UEs. For example, the data type of the service data to be transmitted may be determined based on device types of the UEs initiating the service requests.

The UEs in the 5G network may be categorized into the following types: enhanced mobile broad band (eMBB), massive machine type communication (mMTC), ultra reliable low latency communication (URLLC) and the like.

When the base station receives a service request sent by an URLLC device, an new radio (NR) base station may determine that the service data to be transmitted pertains to latency-sensitive service data.

In step 10-2, if the service data to be transmitted pertains to the latency-sensitive service data, the target frame structure is determined.

In the present disclosure, data of different service types imposes different requirements on the transmission latency. The system may predefine the frame structures corresponding to different service types. For example, the URLLC device imposing a highest requirement on the low latency correspondingly employs the frame structure with the symbol as the basic information transmission unit as illustrated in FIG. 2A.

It should be noted herein that practice of step 10 is not limited to the above two cases. For example, step 10 may be performed based on a combination of the above two cases. Firstly, the type of the network accessed by the UE is judged, and when it is determined that the UE accesses the 5G network, it is further determined that the service to be transmitted pertains to the latency-sensitive service, and then it is determined to employ the frame structure as illustrated in FIG. 2A.

After the target frame structure is determined through step 10, step 11 may be performed: acquiring the downlink control information of the target frame structure.

In step 12, based on the downlink control information, a downlink information transmission unit is scheduled to transmit downlink data and uplink allocation information of the frame.

In one or more embodiments of the present disclosure, the uplink allocation information is configured to indicate scheduling of the uplink resource within the same frame. The uplink allocation information may include: the number of uplink information transmission units allocated within the frame, an embedding position of the downlink feedback resource and the like information.

The uplink allocation information needs to be loaded to a predetermined downlink information transmission unit, and transmitted to the UE over a downlink data link, such that the UE transmits uplink information over an uplink resource in the frame based on the uplink allocation information.

According to different loading positions of the uplink allocation information, step 12 may be practiced in the following two implementation manners:

In a first implementation manner, the uplink allocation information is embedded in a downlink information transmission unit.

Figure 4A:
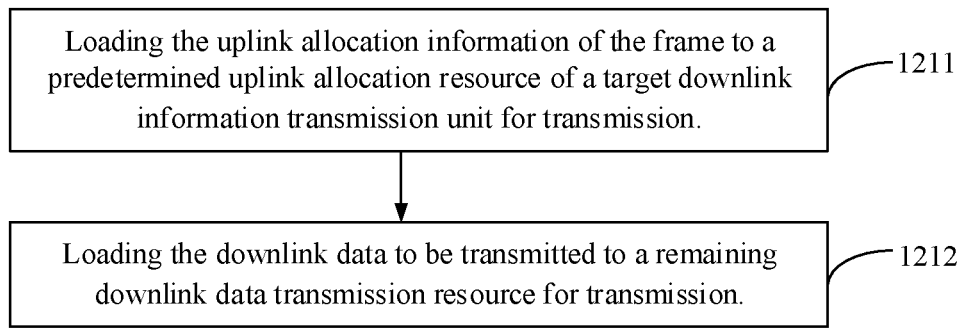
FIG. 4A is a flowchart of another method for transmitting data according to an exemplary embodiment of the present disclosure.

Referring to FIG. 4A, a flowchart of another method for transmitting data according to an exemplary embodiment is illustrated. Step 12 may include the following steps:

In step 1211, the uplink allocation information of the frame is loaded to a predetermined downlink allocation resource of a target downlink information transmission unit for transmission.

Figure 2B:
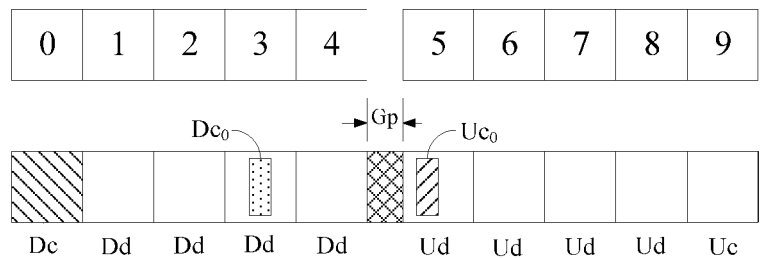
FIG. 2B is a schematic diagram of another frame structure according to an exemplary embodiment of the present disclosure.
Figure 2C:
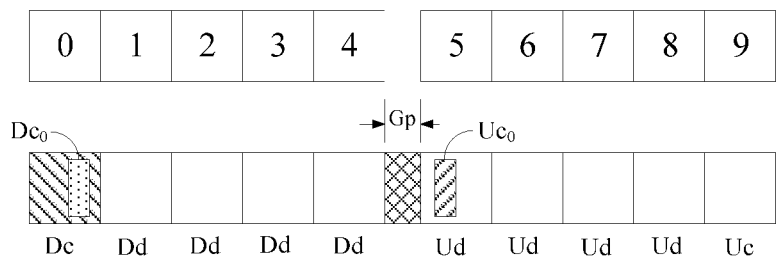
FIG. 2C is a schematic diagram of another frame structure according to an exemplary embodiment of the present disclosure.

In one or more embodiments of the present disclosure, the base station may load the uplink allocation information of the frame to any target downlink information transmission unit, and deliver the uplink allocation information to the UE. The target downlink information transmission unit may be any subsequent downlink data transmission unit Dd, as illustrated in FIG. 2A, FIG. 2B and FIG. 2E. Using FIG. 2B as an example, the uplink allocation information may be loaded to a predetermined uplink allocation resource $Dc_0$ in Dd corresponding to a symbol 3. The target downlink information transmission unit may also be a downlink control information transmission unit Dc at the head of the frame. As illustrated in FIG. 2C, the uplink allocation information may be loaded to the predetermined uplink allocation resource $Dc_0$ in Dc corresponding to a symbol 0.

In step 1212, the downlink data to be transmitted is loaded to a remaining downlink data transmission resource for transmission.

If the uplink allocation information is loaded to a downlink data transmission unit, the downlink data is transmitted over the remaining downlink data transmission resource.

Exemplarily, as illustrated in FIG. 2B, downlink data is transmitted over the remaining downlink data transmission resource of the symbol 3 and the downlink data transmission resources corresponding to symbols 1, 2 and 4.

If the uplink allocation information is loaded to the predetermined uplink allocation resource $Dc_0$ in the downlink control information transmission unit, the downlink data is transmitted by a predetermined downlink data transmission unit.

Correspondingly, as illustrated in FIG. 2C, the base station may transmit the downlink data by the downlink data transmission units corresponding to the symbols 1, 2, 3 and 4.

The downlink data herein refers to ordinary service data delivered to the UE, and does not include the control information.

In a second implementation manner, the uplink allocation information is transmitted by a downlink control information transmission unit.

Figure 2D:
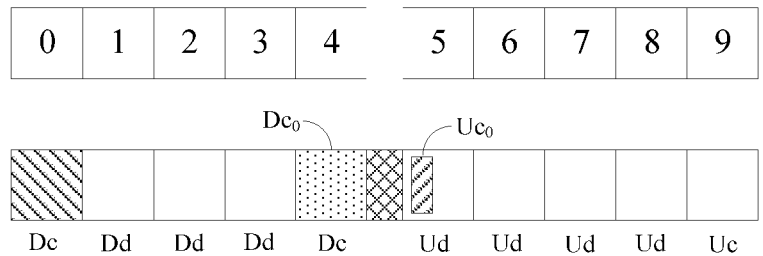
FIG. 2D is a schematic diagram of another frame structure according to an exemplary embodiment of the present disclosure.
Figure 2E:
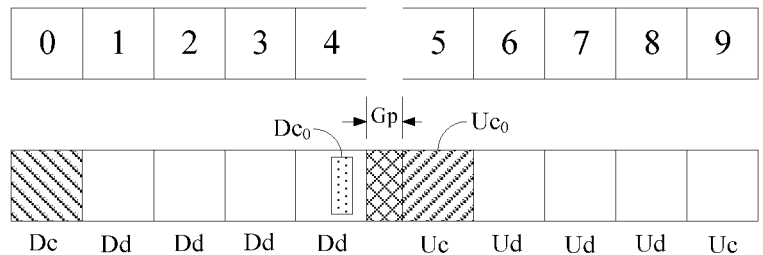
FIG. 2E is a schematic diagram of another frame structure according to an exemplary embodiment of the present disclosure.

Referring to a schematic diagram of another frame structure according to an exemplary embodiment as illustrated in FIG. 2D, in the frame structure, the uplink allocation information may be transmitted separately by a downlink control information transmission unit Dc, for example, the downlink control information transmission unit corresponding to the symbol 4.

Figure 4B:
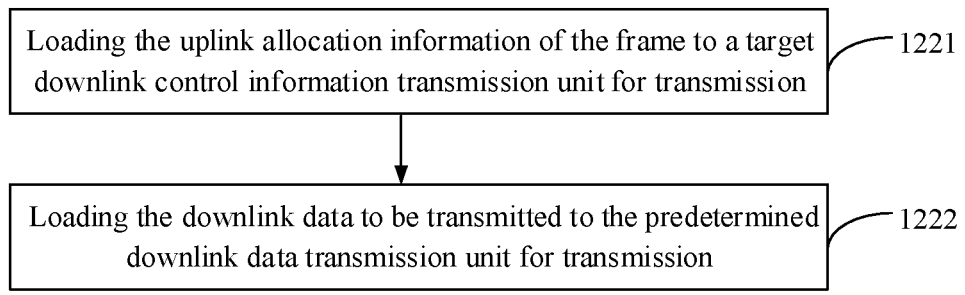
FIG. 4B is a flowchart of another method for transmitting data according to an exemplary embodiment of the present disclosure.

Referring to a flowchart of another method for transmitting data according to an exemplary embodiment as illustrated in FIG. 4B, step 12 may include the following steps:

In step 1221, the uplink allocation information of the frame is loaded to a target downlink control information transmission unit for transmission.

In one or more embodiments of the present disclosure, the base station may load the uplink allocation information of the frame to a predetermined downlink control information transmission unit in the frame, that is, the target downlink control information transmission unit, and deliver the uplink allocation information to the UE. The position of the target downlink control information transmission unit is not limited. For example, the target downlink control information transmission unit may be the last downlink information transmission unit prior to the transition latency Gp. As illustrated in FIG. 2D, the symbol 4 corresponds to the target downlink control information transmission unit.

In step 1222, the downlink data to be transmitted is loaded to the predetermined downlink data transmission unit for transmission.

In the frame structure as illustrated in FIG. 2D, the base station loads the downlink data to the downlink data transmission units Dd corresponding to the symbols 1, 2 and 3 for transmission.

The base station may transmit downlink information to the UE in the above two implementation manners. The downlink information may include downlink data and uplink allocation information of the frame.

Correspondingly, upon acquiring the uplink allocation information from the downlink information, the UE may feed back, based on the uplink application information, the HARQ information transmitted over the downlink data, and transmit the uplink data.

In step 13, based on the uplink allocation information, hybrid automatic repeat request (HARQ) feedback information transmitted over the downlink data and uplink data is acquired from an uplink information transmission unit.

The downlink data transmission refers to transmitting the downlink data by the downlink data transmission unit in the frame.

In one or more embodiments of the present disclosure, in the frame structure as illustrated in FIG. 2A, booth the downlink information transmission unit and the uplink information transmission unit are included, wherein a uplink-downlink transition latency is defined between these two transmission units.

Based on the above frame structure, the system may complete two complete data transmission processes by a frame structure. With respect to downlink transmission, that is, transmission from the base station to the UE, a complete data transmission process refers to: upon transmission of downlink data, receiving HARQ feedback information transmitted over the downlink data to determine whether the UE successfully acquires the data.

With respect to uplink transmission, that is, transmission from the UE to the base station, a complete data transmission process refers to: firstly acquiring uplink allocation information, and then transmitting uplink data to the base station by a uplink resource indicated by the uplink allocation information.

Figure 5A:
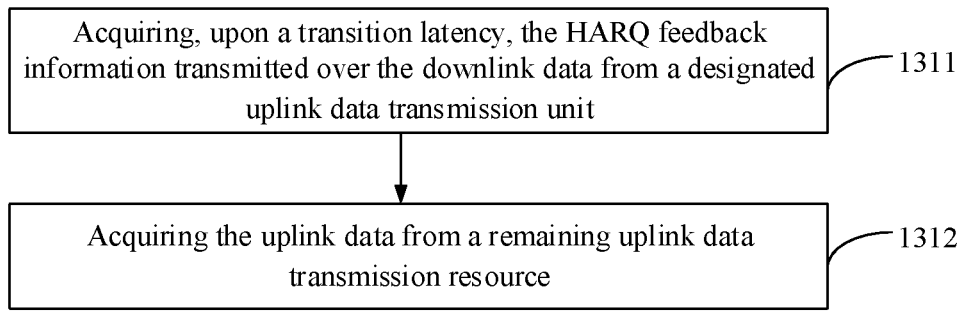
FIG. 5A is a flowchart of another method for transmitting data according to an exemplary embodiment of the present disclosure.

In one or more embodiments of the present disclosure, based on whether the downlink feedback resource is embedded to the designated uplink data transmission unit, step 13 may be practiced in the following two implementation manners:

In a first implementation manner, if the downlink feedback resource is embedded in the designated uplink data transmission unit, referring to a flowchart of another method for transmitting data according to an exemplary embodiment as illustrated in FIG. 5A, step 13 may include the following steps:

In step 1311, upon a transition latency, the HARQ feedback information transmitted over the downlink data is acquired from a designated uplink data transmission unit.

In the frame structures as illustrated in FIG. 2A to FIG. 2D, for a shorter feedback latency of the HARQ information, a downlink feedback resource Uc0 configured to bear the HARQ feedback information transmitted over the downlink data may be embedded in a first uplink data transmission unit upon the transition latency Gp. For example, as illustrated in FIG. 2D, the downlink feedback resource Uc0 is embedded in the uplink data transmission unit Ud corresponding to a symbol 5.

In step 1312, the uplink data is acquired from a remaining uplink data transmission resource.

Upon acquiring the HARQ feedback information transmitted over the downlink data based on embedded configuration information of the downlink feedback resource, the base station may acquire the uplink data from the remaining resource in the first uplink data transmission unit and the subsequent uplink data transmission units.

Still using FIG. 2D as an example, the base station may acquire the uplink data from the remaining uplink data corresponding to the symbol 5, and uplink data transmission units corresponding to symbols 6, 7 and 8.

Figure 5B:
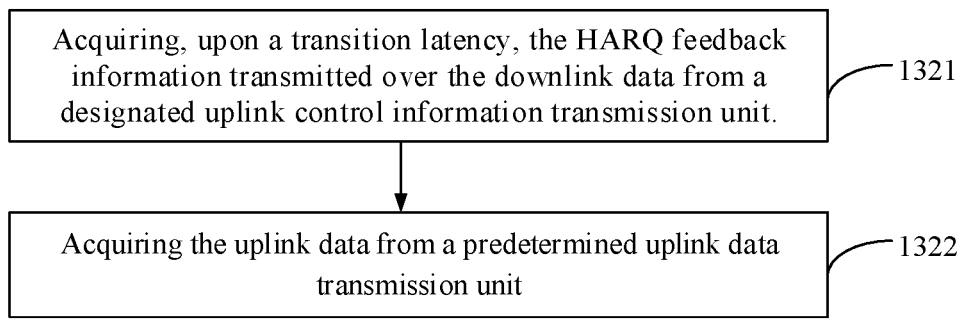
FIG. 5B is a flowchart of another method for transmitting data according to an exemplary embodiment of the present disclosure.

In a second implementation manner, if the downlink feedback information separately occupies an uplink control information transmission unit, referring to a flowchart of another method for transmitting data according to an exemplary embodiment as illustrated in FIG. 5B, step 13 may include the following steps:

In step 1321, upon a transition latency, the HARQ feedback information transmitted over the downlink data is acquired from a designated uplink control information transmission unit.

In one or more embodiments of the present disclosure, for a shorter feedback latency of the HARQ information, the first uplink information transmission unit upon the transition latency may be employed as an uplink control information transmission unit configured to transmit the HARQ feedback information, and the subsequent uplink information transmission units are employed as the uplink data transmission units.

Referring to a schematic diagram of another frame structure according to an exemplary embodiment as illustrated in FIG. 2E, the base station may acquire the HARQ feedback information from the uplink control information transmission unit positioned upon the transition latency Gp and corresponding to the symbol 5.

In step 1322, the uplink data is acquired from a predetermined uplink data transmission unit.

Correspondingly, as illustrated in FIG. 2E, the base station may acquire the uplink data from the uplink data transmission units corresponding to the symbols 6, 7 and 8.

Until now, the base station may practice a complete downlink data transmission process and a complete uplink data transmission process by using one data frame.

It is apparent that with the method for transmitting data according to the present disclosure, a complete downlink data transmission process and a complete uplink data transmission process may be practiced by using one data frame, and in addition, the practice only experience an uplink-downlink transition latency. In this way, on the premise of not affecting flexibility of acquiring the HARQ feedback information transmitted over the downlink data, a latency caused due to uplink-downlink switchover is effectively shortened, and information transmission efficiency is improved.

Figure 6:
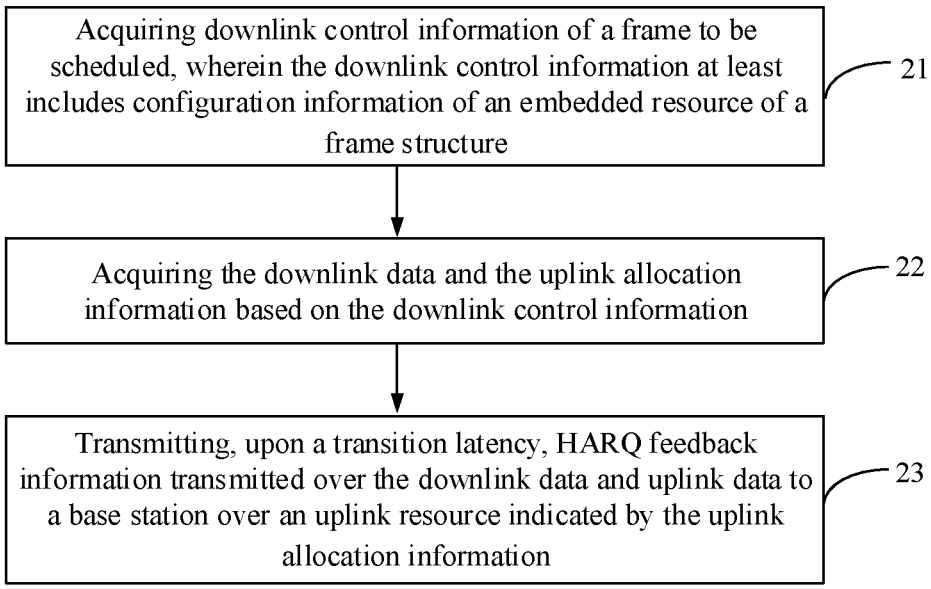
FIG. 6 is a flowchart of a method for transmitting data according to an exemplary embodiment of the present disclosure.

Correspondingly, the present disclosure provides a method for transmitting data, which is applied to a UE. Referring to FIG. 6, a method for transmitting data according to an exemplary embodiment. The method may include the following steps:

In step 21, downlink control information of a frame to be scheduled is acquired, wherein the downlink control information at least includes configuration information of an embedded resource of a frame structure.

The embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

The UE may acquire the downlink control information in at least one of the following ways:

In a first way, the downlink control information is acquired from a system broadcast signaling, for example, system configuration information broadcast by the system. This way is applicable to a scenario where the same frame structure is employed in the data transmission channel in the 5G network.

In a second way, the downlink control information is acquired from an RRC upper-layer control signaling.

In a third way, the downlink control information is acquired from a downlink control information transmission unit at a head of the frame. That is, the downlink control information is stored in a first downlink control information transmission unit of each frame structure. This way is applicable to a scenario where each frame structures needs to be configured based on the size of the data to be transmitted.

In a fourth way, the downlink control information is acquired from a physical-layer control signaling of a physical downlink control channel (PDCCH).

In step 22, the downlink data and the uplink allocation information are acquired based on the downlink control information.

Upon acquiring the downlink control information, the UE receives the downlink data based on downlink resource schedule information.

Two implementation manners are included according to embedding of the uplink allocation information.

A first implementation manner corresponds to the first implementation manner in step 12. That is, the downlink control information includes embedded configuration information of the uplink allocation information.

Figure 7A:
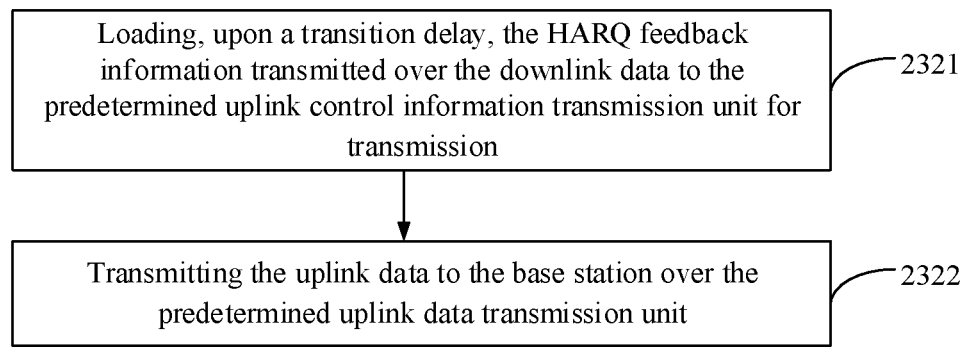
FIG. 7A is a flowchart of another method for transmitting data according to an exemplary embodiment of the present disclosure.

Referring to a flowchart of another method for transmitting data according to an exemplary embodiment as illustrated in FIG. 7A, step 22 may include the following steps:

In step 2211, the uplink allocation information is acquired from a predetermined downlink allocation resource of a target downlink information transmission unit.

In a first case, if the downlink control information indicates that the uplink allocation resource of the frame is embedded in the downlink control information transmission unit at the head of the frame, after the first downlink control information transmission unit arrives, the uplink allocation information is acquired therefrom, as illustrated in FIG. 2C.

In a second case, if the downlink control information indicates that the uplink allocation resource of the frame is embedded in the predetermined downlink data transmission unit, after it is detected that the predetermined downlink data transmission unit arrives, the uplink allocation information is acquired therefrom, as illustrated in FIG. 2A, FIG. 2B and FIG. 2E.

In step 2212, the downlink data is acquired from a remaining downlink data transmission resource.

Corresponding to the first case, the downlink data is acquired from the downlink data transmission unit. As illustrated in FIG. 2C, the downlink data is acquired from the downlink data transmission units corresponding to the symbols 1, 2, 3 and 4 respectively.

Corresponding to the second case, the downlink data is acquired from the remaining downlink data transmission resource. That is, the downlink data is acquired from the remaining resource in the target downlink data transmission unit and the other downlink data transmission units, as illustrated in FIG. 2A, FIG. 2B and FIG. 2E. Using FIG. 2E as an example, the downlink data is acquired from the downlink data transmission units corresponding to the symbols 1, 2 and 3 in sequence, and the downlink data is acquired from the downlink data transmission resource corresponding to the symbol 4.

A second implementation manner corresponds to the second implementation manner in step 12. That is, the downlink control information includes: details indicating that the uplink allocation information is transmitted separately by a downlink control information transmission unit. As illustrated in FIG. 2D, the symbol 4 acts as a downlink control information transmission unit and separately bears the uplink allocation information Dc0.

Figure 7B:
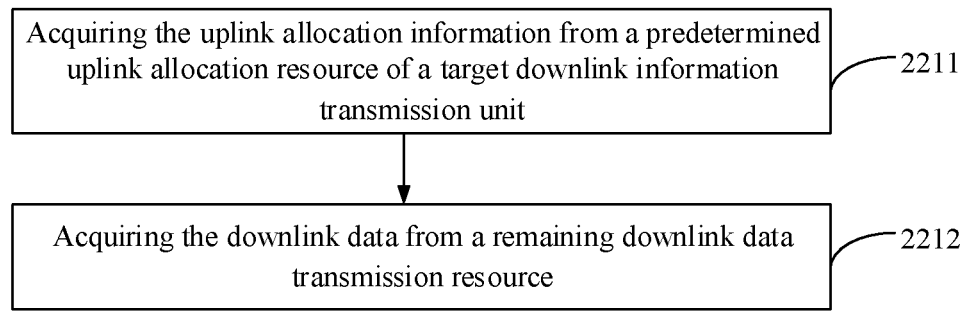
FIG. 7B is a flowchart of method for transmitting data according to an exemplary embodiment of the present disclosure.

Referring to a flowchart of another method for transmitting data according to an exemplary embodiment as illustrated in FIG. 7B, step 22 may include the following steps:

In step 2221, the uplink allocation information is acquired from the target downlink control information transmission unit.

In step 2222, the downlink data is acquired from the predetermined downlink data transmission unit.

As illustrated in FIG. 2D, the UE may acquire the downlink data in sequence from the downlink data transmission units corresponding to the symbols 1, 2 and 3, and acquire the uplink allocation information from the downlink control information transmission unit Dc corresponding to the symbol 4.

In step 23, upon a transition latency, acquire, HARQ feedback information transmitted over the downlink data and uplink data is transmitted to a base station over an uplink resource indicated by the uplink allocation information.

Corresponding to step 13, depending on the configurations of the downlink feedback resource, step 23 may include the following two implementation manners:

A first implementation manner corresponds to the first implementation manner in step 13. That is, the downlink feedback resource is embedded in an uplink data transmission unit, as illustrated in FIG. 2A to FIG. 2D.

Figure 8A:
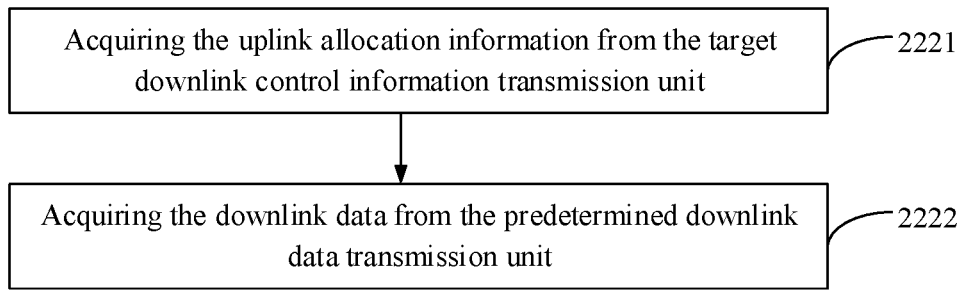
FIG. 8A is a flowchart of another method for transmitting data according to an exemplary embodiment of the present disclosure.

Referring to a flowchart of another method for transmitting data according to an exemplary embodiment as illustrated in FIG. 8A, step 23 may include the following steps:

In step 2311, upon a transition latency, the HARQ feedback information transmitted over the downlink data is loaded to a downlink feedback resource of a target uplink data transmission unit for transmission.

Upon receiving the downlink data over a downlink data transmission link, the UE generates the HARQ feedback information based on whether the downlink data is successfully received, wherein the HARQ feedback information includes ACK information and NACK information. Afterwards, the HARQ feedback information, for example, the ACK information, is loaded to the downlink feedback resource in the target uplink data transmission unit, for example, a predetermined downlink feedback resource in the first uplink data transmission unit, and then transmitted to the base station. Exemplarily, as illustrated in FIG. 2D, reception details of the downlink data corresponding to the symbols 1, 2 and 3 are loaded to the predetermined downlink feedback resource in the uplink data transmission unit corresponding to the symbol 5. If the downlink data is successfully received, the ACK information is loaded to the downlink feedback resource Uc0 in the symbol 5, and then fed back to the base station.

In step 2312, the uplink data is transmitted to the base station over the remaining uplink data transmission resource.

The remaining uplink data transmission resource includes the remaining resource in the first uplink data transmission unit, and the other uplink data transmission units.

Still using the frame structure as illustrated in FIG. 2D as an example, the uplink data is loaded to the remaining uplink resource corresponding to the symbol 5, and the uplink data transmission units corresponding to the symbols 6, 7 and 8, and transmitted to the base station.

A second implementation manner corresponds to the second implementation manner in step 13. That is, the downlink feedback resource is embedded in an uplink data transmission unit.

Figure 8B:
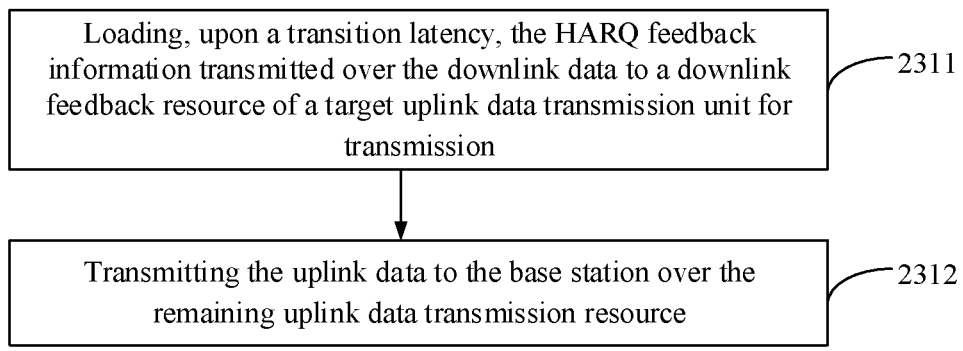
FIG. 8B is a flowchart of another method for transmitting data according to an exemplary embodiment of the present disclosure.

Referring to a flowchart of another method for transmitting data according to an exemplary embodiment as illustrated in FIG. 8B, step 23 may include the following steps:

In step 2321, upon a transition delay, the HARQ feedback information transmitted over the downlink data is loaded to the predetermined uplink control information transmission unit for transmission.

Referring to the schematic diagram of the frame structure as illustrated in FIG. 2E, in this case, the HARQ feedback information may separately an uplink information transmission unit, which is referred to as an uplink control information transmission unit. For a shorter feedback latency of the HARQ information transmitted over the downlink data, the uplink control information transmission unit may be employed as the first uplink information transmission unit upon the transition latency. As illustrated in FIG. 2E, the uplink information transmission unit corresponding to the symbol 5 upon the transition latency Gp is employed as the uplink control information transmission unit configured to bear the HARQ feedback information transmitted over the downlink data.

In step 2322, the uplink data is transmitted to the base station over the predetermined uplink data transmission unit.

Using the frame structure as illustrated in FIG. 2E as an example only, the uplink data is transmitted to the base station by the uplink data transmission units corresponding to the symbols 6, 7 and 8.

It is apparent that with the method for transmitting data according to the present disclosure, the UE may implement a completed downlink data reception process in one data frame, and upon the transition latency from uplink to downlink, the UE may practice a complete uplink data transmission process in the frame.

Figure 2F:
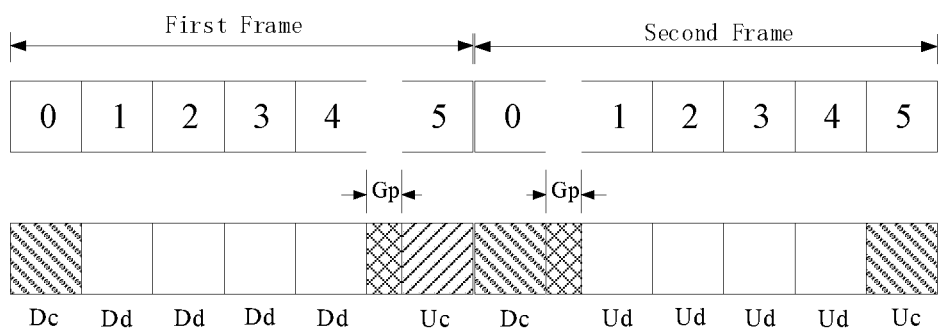
FIG. 2F is a schematic diagram of a frame structure according to an exemplary embodiment in the related art.

In the related art, only one complete data transmission process may be implemented in one data frame, and at least two data frames are needed and at least two uplink-downlink transition latencies need to be experienced, if the UE is to practice two complete data transmission processes. Referring to a schematic diagram of contiguous uplink and downlink data transmission according to an embodiment as illustrated in FIG. 2F, a complete downlink data transmission process is practiced by using a first frame, and a transition latency Gp needs to be experienced; and subsequently, a complete uplink data transmission process is practiced by using a second frame, and still a transition latency needs to be experienced.

Through comparison, it is known that with the method for transmitting data according to the present disclosure, the uplink-downlink transition may be effectively shortened, timeliness of the HARQ feedback information transmitted over the downlink data is not affected, and in addition, two complete data transmission processes may be practiced by using one data frame. In this way, transmission efficiency of the service data may be entirely improved, particularly, transmission efficiency of high-latency-sensitive service data may be effectively improved, and user experience of the device may be enhanced.

With respect to the above described method embodiments, for brevity of description, the actions or steps are all described as a series of action combinations. However, a person skilled in the art shall understand that the embodiments of the present disclosure are not subjected to limitations of the action sequences described above. Further, based on the embodiments of the present disclosure, some steps may be performed in another or other sequences or may be simultaneously performed.

In addition, a person skilled in the art should also know that the embodiments described in the description herein are all preferred embodiments, and all the involved actions and modules are not mandatory ones of the embodiments of the present disclosure.

Corresponding to the embodiments of the method for implementing the application functionality, the present disclosure further provides embodiments of an apparatus and terminal for implementing the application functionality.

Figure 9:
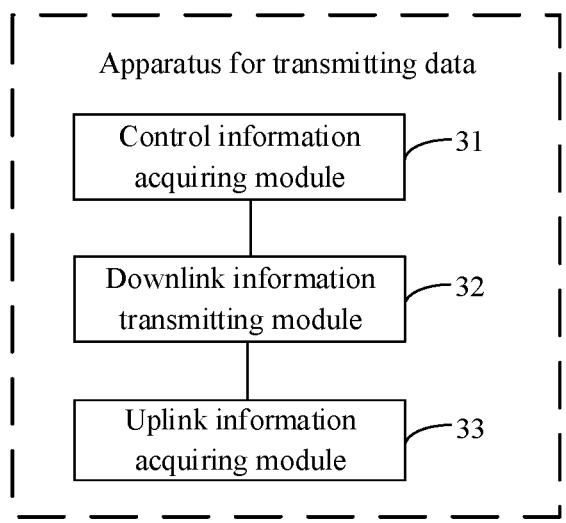
FIG. 9 is a block diagram of an apparatus for transmitting data according to an exemplary embodiment of the present disclosure.

Referring to a block diagram of an apparatus for transmitting data according to an exemplary embodiment as illustrated in FIG. 9, the apparatus is arranged in a base station, and the apparatus includes:

a control information acquiring module 31, configured to acquire downlink control information of a frame to be scheduled, wherein the downlink control information at least includes configuration information of an embedded resource of the frame to be scheduled;

wherein the embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data;

a downlink information transmitting module 32, configured to schedule, based on the downlink control information, a downlink information transmission unit to transmit downlink data and uplink allocation information of the frame; and an uplink information acquiring module 33, configured to, upon a transition latency, acquire, based on the uplink allocation information, hybrid automatic repeat request (HARQ) feedback information transmitted over the downlink data and uplink data from an uplink information transmission unit.

Figure 10:
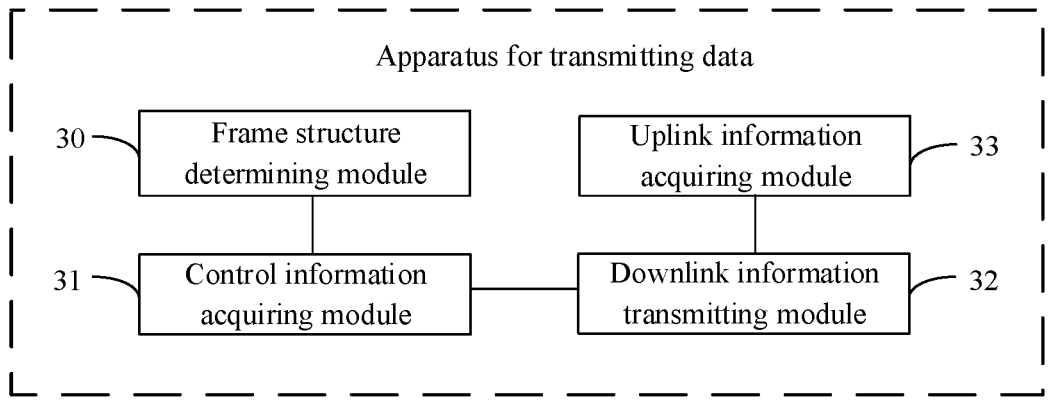
FIG. 10 is a block diagram of another apparatus for transmitting data according to an exemplary embodiment of the present disclosure.

Referring to a block diagram of another apparatus for transmitting data according to an exemplary embodiment as illustrated in FIG. 10, based on the apparatus embodiment illustrated in FIG. 9, the apparatus in FIG. 10 further may further include:

a frame structure determining module 30, configured to determine a target frame structure based on a service to be transmitted, wherein the target frame at least includes: a downlink data transmission unit, a transition latency, and an uplink data transmission unit.

Figure 11:
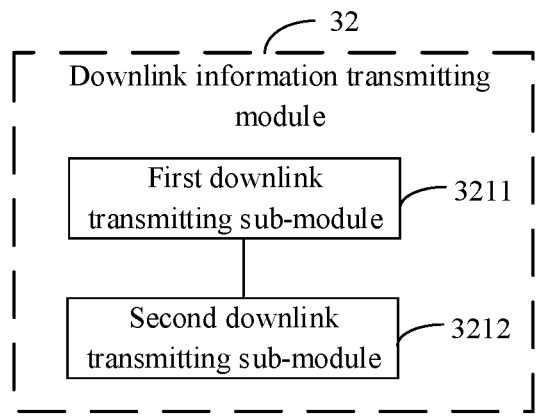
FIG. 11 is a block diagram of another apparatus for transmitting data according to an exemplary embodiment of the present disclosure.

Referring to a block diagram of another apparatus for transmitting data according to an exemplary embodiment as illustrated in FIG. 11, based on the apparatus embodiment illustrated in FIG. 9, the downlink information transmitting module 32 may include:

a first downlink transmitting sub-module 3211, configured to load the uplink allocation information of the frame to a predetermined downlink allocation resource of a target downlink information transmission unit for transmission; and a second downlink transmitting sub-module 3212, configured to load the downlink data to be transmitted to a remaining downlink data transmission resource for transmission.

Figure 12:
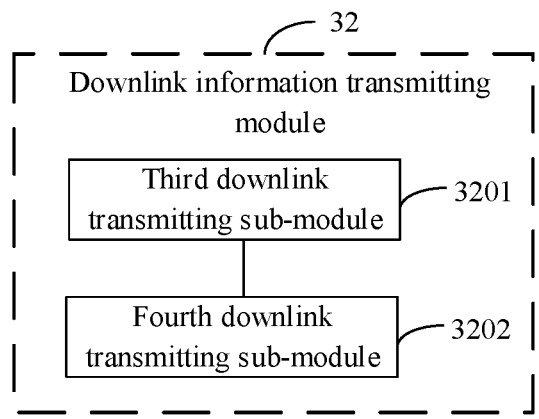
FIG. 12 is a block diagram of another apparatus for transmitting data according to an exemplary embodiment of the present disclosure.

Referring to a block diagram of another apparatus for transmitting data according to an exemplary embodiment as illustrated in FIG. 12, based on the apparatus embodiment illustrated in FIG. 9, the downlink information transmitting module 32 may include:

a third downlink transmitting sub-module 3201, configured to load the uplink allocation information of the frame to a target downlink control information transmission unit for transmission; and a fourth downlink transmitting sub-module 3202, configured to load the downlink data to be transmitted to a predetermined downlink data transmission unit for transmission.

Figure 13:
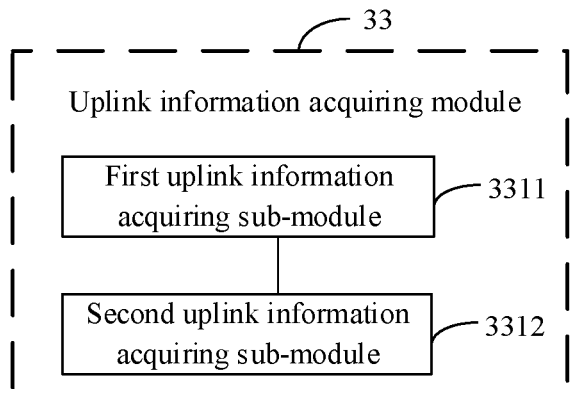
FIG. 13 is a block diagram of another apparatus for transmitting data according to an exemplary embodiment of the present disclosure.

Referring to a block diagram of another apparatus for transmitting data according to an exemplary embodiment as illustrated in FIG. 13, based on the apparatus embodiment illustrated in FIG. 9, the uplink information acquiring module 33 may include:

a first uplink information acquiring sub-module 3311, configured to, upon a transition latency, acquire the HARQ feedback information transmitted over the downlink data from a designated uplink data transmission unit;

a second uplink information acquiring sub-module 3312, configured to acquire the uplink data from a remaining uplink data transmission resource.

Figure 14:
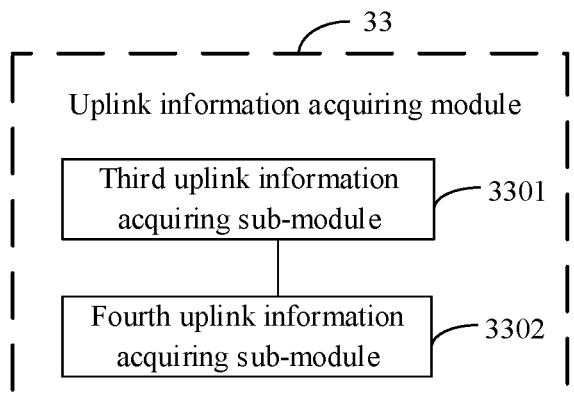
FIG. 14 is a block diagram of another apparatus for transmitting data according to an exemplary embodiment of the present disclosure.

Referring to a block diagram of another apparatus for transmitting data according to an exemplary embodiment as illustrated in FIG. 14, based on the apparatus embodiment illustrated in FIG. 9, the uplink information acquiring module 33 may include:

a third uplink information acquiring sub-module 3301, configured to, upon a transition latency, acquire the HARQ feedback information transmitted over the downlink data from a designated uplink control information transmission unit; and a fourth uplink information acquiring sub-module 3302, configured to acquire the uplink data from a predetermined uplink data transmission unit.

Figure 15:
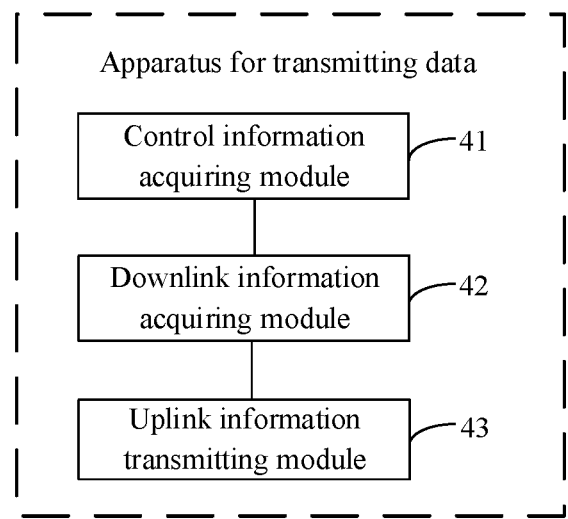
FIG. 15 is a block diagram of an apparatus for transmitting data according to an exemplary embodiment of the present disclosure.

Correspondingly, the present disclosure further provides an apparatus for transmitting data that is deployed in a UE. Referring to a block diagram of an apparatus for transmitting data according to an exemplary embodiment as illustrated in FIG. 15, the apparatus may include:

a control information acquiring module 41, configured to acquire downlink control information of a frame to be scheduled, wherein the downlink control information at least includes configuration information of an embedded resource of a frame structure;

wherein the embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data;

In one or more embodiments of the present disclosure, the control information acquiring module 41 may be configured to acquire the downlink control information in at least one of the following ways:

acquiring the downlink control information from a system broadcast signaling;

acquiring the downlink control information from a Radio Resource Control (RRC) upper-layer control signaling;

acquiring the downlink control information from a downlink control information transmission unit at a head of the frame; or acquiring the downlink control information from a physical-layer control signaling of a physical downlink control channel;

a downlink information acquiring module 42, configured to acquire downlink data and uplink allocation information based on the downlink control information; and an uplink information transmitting module 43, configured to, upon a transition latency, transmit hybrid automatic repeat request (HARQ) feedback information transmitted over the downlink data and uplink data to a base station over an uplink resource indicated by the uplink allocation information.

Figure 16:
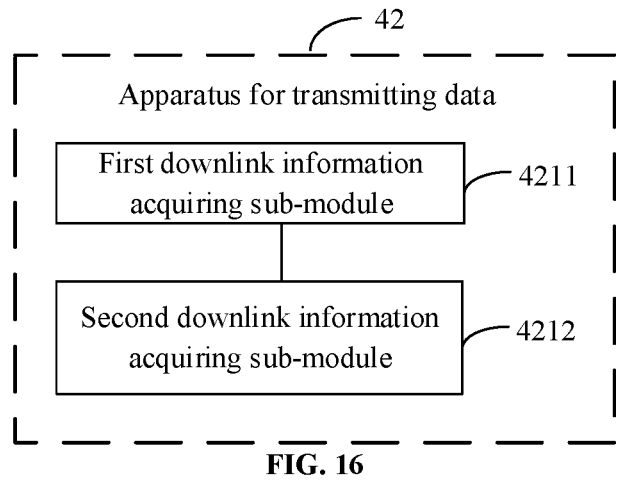
FIG. 16 is a block diagram of another apparatus for transmitting data according to an exemplary embodiment of the present disclosure.

Referring to a block diagram of another apparatus for transmitting data according to an exemplary embodiment as illustrated in FIG. 16, based on the apparatus embodiment illustrated in FIG. 15, the downlink information acquiring module 42 may include:

a first downlink information acquiring sub-module 4211, configured to acquire the uplink allocation information from a predetermined downlink allocation resource of a target downlink information transmission unit; and a second downlink information acquiring sub-module 4212, configured to acquire the downlink data from a remaining downlink data transmission resource.

Figure 17:
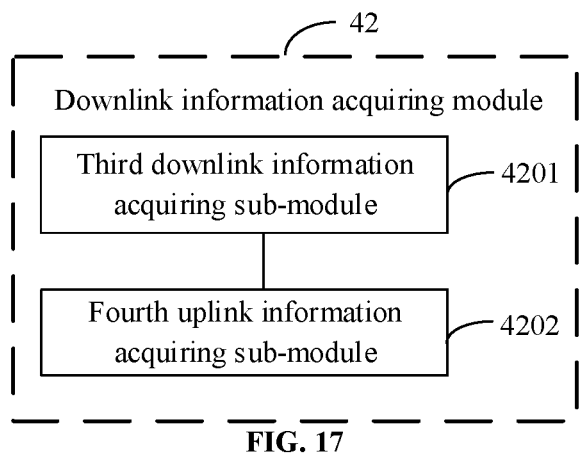
FIG. 17 is a block diagram of another apparatus for transmitting data according to an exemplary embodiment of the present disclosure.

Referring to a block diagram of another apparatus for transmitting data according to an exemplary embodiment as illustrated in FIG. 17, based on the apparatus embodiment illustrated in FIG. 15, the downlink information acquiring module 42 may include:

a third downlink information acquiring sub-module 4201, configured to acquire the uplink allocation information from a target downlink control information transmission unit; and a fourth uplink information acquiring sub-module 4202, configured to acquire the downlink data from a predetermined downlink data transmission unit.

Figure 18:
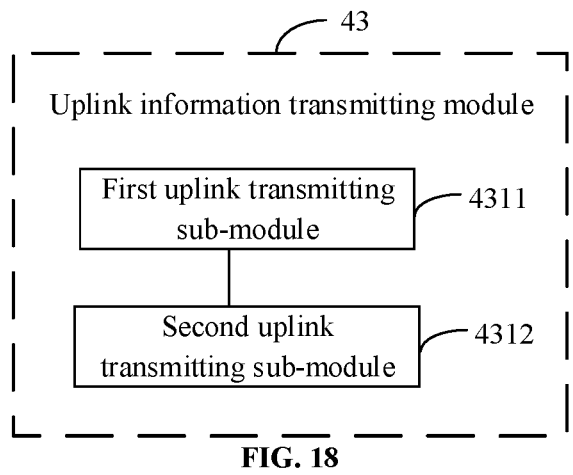
FIG. 18 is a block diagram of another apparatus for transmitting data according to an exemplary embodiment of the present disclosure.

Referring to a block diagram of another apparatus for transmitting data according to an exemplary embodiment as illustrated in FIG. 18, based on the apparatus embodiment illustrated in FIG. 15, the uplink information transmitting module 43 may include:

a first uplink transmitting sub-module 4311, configured to, upon a transition latency, loading the HARQ feedback information transmitted over the downlink data to a downlink feedback resource of a target uplink data transmission unit for transmission; and a second uplink transmitting sub-module 4312, configured to transmit the uplink data to a base station over a remaining uplink data transmission resource.

Figure 19:
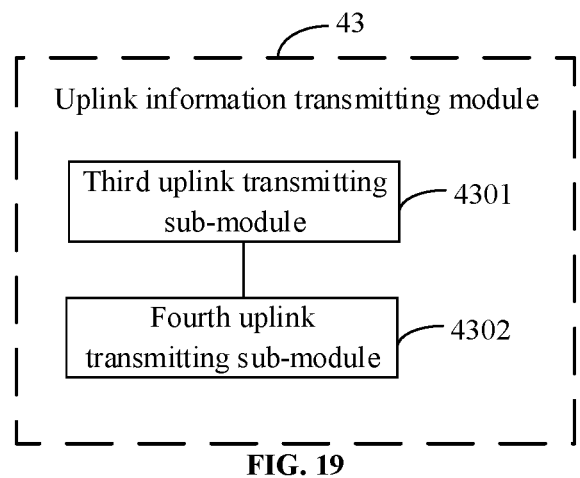
FIG. 19 is a block diagram of another apparatus for transmitting data according to an exemplary embodiment of the present disclosure.

Referring to a block diagram of another apparatus for transmitting data according to an exemplary embodiment as illustrated in FIG. 19, based on the apparatus embodiment illustrated in FIG. 15, the uplink information transmitting module 43 may include:

a third uplink transmitting sub-module 4301, configured to, upon a transition latency, load the HARQ feedback information transmitted over the downlink data to a predetermined uplink control information transmission unit for transmission; and a fourth uplink transmitting sub-module 4302, configured to transmit the uplink data to a base station over a predetermined uplink data transmission unit.

Since the apparatus embodiments substantially correspond to the method embodiments, the apparatus embodiments are described simply, and the relevant part may be obtained with reference to the part of the description in the method embodiments. The above described apparatus embodiments are merely for illustration purpose only. The units which are described as separate components may be physically separated or may be not physically separated, and the components which are illustrated as units may be or may not be physical units, that is, the components may be located in the same position or may be distributed into a plurality of network units. A part or all the modules may be selected according to the actual needs to achieve the objectives of the technical solutions according to the embodiments of the present disclosure. Persons of ordinary skill in the art may understand and implement the present disclosure without paying any creative effort.

Correspondingly, one aspect of the present disclosure provides an apparatus for use in data transmission. The apparatus includes: at least one processor; and a memory for storing instructions executable by the at least one processor. The at least one processor is configured to:

acquire downlink control information of a frame to be scheduled, the downlink control information at least including configuration information of an embedded resource;

schedule, based on the downlink control information, a downlink information transmission unit to transmit downlink data and uplink allocation information of the frame; and upon a transition latency, acquire, based on the uplink allocation information, hybrid automatic repeat request (HARQ) feedback information transmitted over the downlink data and uplink data from an uplink information transmission unit;

wherein the embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

Correspondingly, another aspect of the present disclosure further provides an apparatus for use in data transmission. The apparatus includes: at least one processor; and a memory for storing instructions executable by the at least one processor. The at least one processor is configured to:

acquire downlink control information of a frame to be scheduled, the downlink control information at least including configuration information of an embedded resource of a frame structure;

acquire downlink data and uplink allocation information based on the downlink control information;

upon a transition latency, acquire, transmit hybrid automatic repeat request (HARQ) feedback information transmitted over the downlink data and uplink data to a base station over an uplink resource indicated by the uplink allocation information;

wherein the embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

Figure 20:
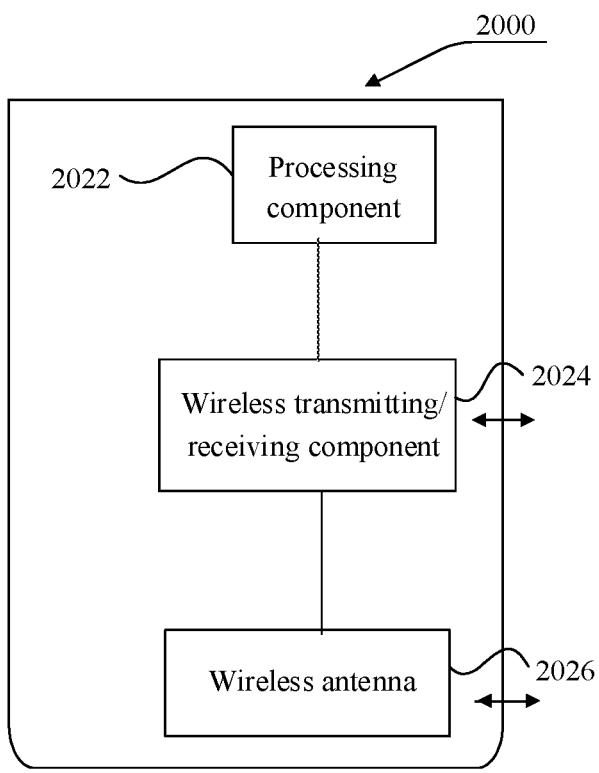
FIG. 20 is a block diagram of an apparatus for use in data transmission according to an exemplary embodiment of the present disclosure.

As illustrated in FIG. 20, FIG. 20 is a schematic structural diagram of an apparatus 2000 for use in data transmission according to an exemplary embodiment of the present disclosure. The apparatus 2000 may be provided as a base station.

Referring to FIG. 20, the apparatus 2000 includes a processing component 2022, a wireless transmitting/receiving component 2024, a wireless antenna 2026 and a signal processing part dedicated for a wireless interface. The processing component 2022 may further include one or a plurality of processors.

One processor in the processing component 2022 may be configured to:

acquire downlink control information of a frame to be scheduled, the downlink control information at least including configuration information of an embedded resource;

schedule, based on the downlink control information, a downlink information transmission unit to transmit downlink data and uplink allocation information of the frame; and upon a transition latency, acquire, based on the uplink allocation information, hybrid automatic repeat request (HARQ) feedback information transmitted over the downlink data and uplink data from an uplink information transmission unit;

wherein the embedded resource includes: an uplink allocation resource embedded in the downlink information transmission unit and configured to bear the uplink allocation information; and/or a downlink feedback resource embedded in the uplink information transmission unit and configured to bear the HARQ feedback information transmitted over the downlink data.

In an exemplary embodiment, a non-transitory computer-readable storage medium including instructions may be further provided. The non-transitory computer-readable storage medium stores computer instructions, which may be executed by the processing component 2022 in the apparatus 200 to perform the method for transmitting data as illustrated in FIG. 1 to FIG. 5B. For example, the non-transitory computer-readable storage medium may be a read-only memory (ROM), a random access memory (RAM), a compact disc ROM (CD-ROM), a magnetic tape, a floppy disk, an optical data storage device or the like.

Figure 21:
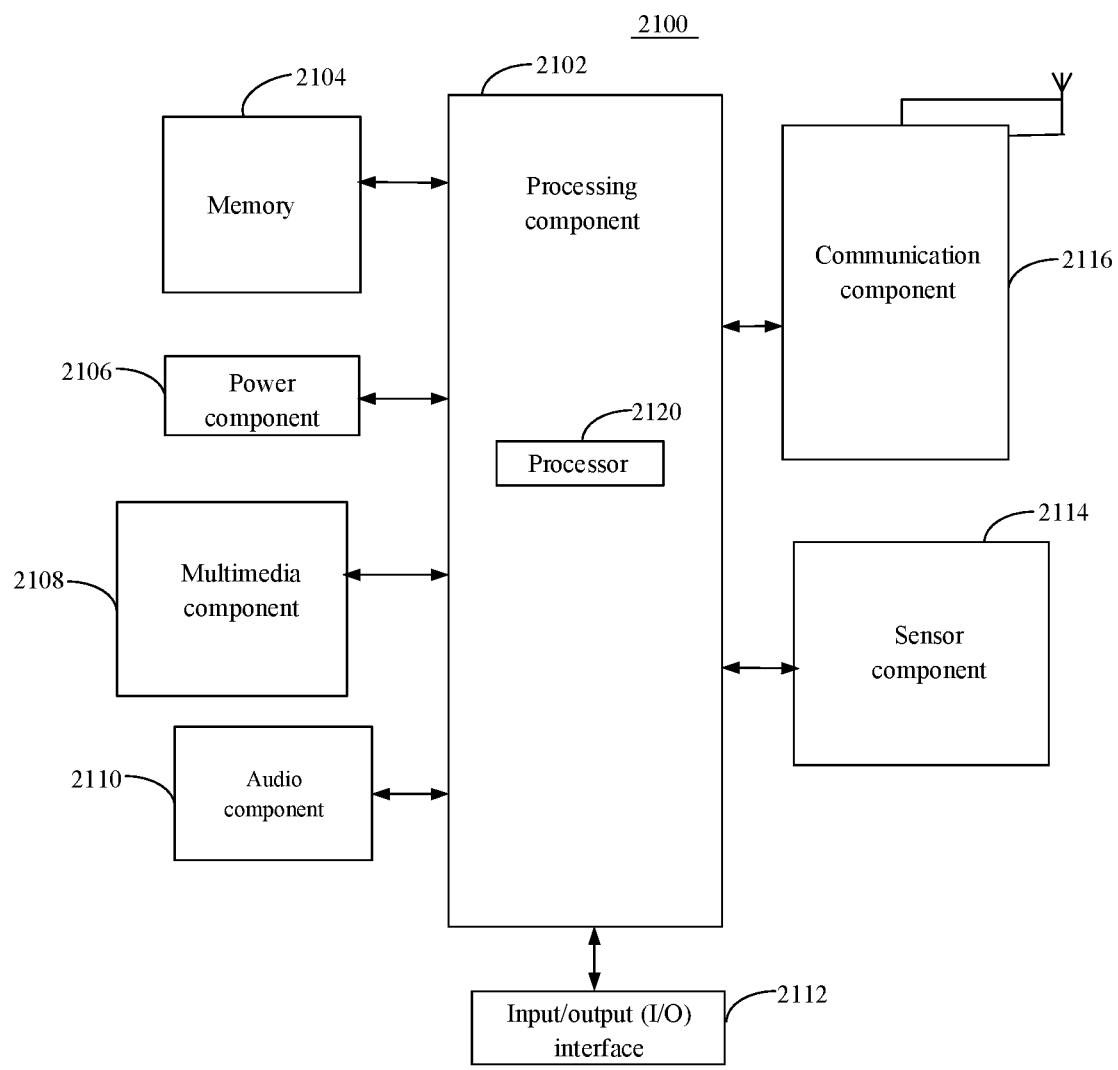
FIG. 21 is a block diagram of another apparatus for use in data transmission according to an exemplary embodiment of the present disclosure.

FIG. 21 is a schematic structural diagram of an apparatus 2100 for transmitting data illustrated in accordance with an exemplary embodiment. For example, the apparatus 2100 may be a terminal, and may specifically be a mobile phone, a computer, a digital broadcasting terminal, a messaging device, a game console, medical equipment, fitness equipment, a personal digital assistance, and a wearable device, such as a smart watch, a pair of smart glasses, smart, a smart bracelet, smart shoes, etc.

Referring to FIG. 21, the apparatus 2100 may include one or more of the following components: a processing component 2102, a memory 2104, a power component 2106, a multimedia component 2108, an audio component 2110, an input/output (I/O) interface 2112, a sensor component 2114, and a communication component 2116.

The processing component 2102 typically controls the overall operations of the apparatus 2100, such as the operations associated with display, telephone calls, data communications, camera operations, and recording operations. The processing component 2102 may include one or more processors 2120 to execute instructions to perform all or part of the steps in the above described methods. Moreover, the processing component 2102 may include one or more modules which facilitate the interaction between the processing component 2102 and other components. For instance, the processing component 2102 may include a multimedia module to facilitate the interaction between the multimedia component 2108 and the processing component 2102.

The memory 2104 is configured to store various types of data to support the operation of the apparatus 2100. Examples of such data include instructions for any applications or methods operated on the apparatus 2100, contact data, phonebook data, messages, pictures, videos, etc. The memory 2104 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2106 provides power to various components of the apparatus 2100. The power component 2106 may include a power management system, one or more power sources, and any other components associated with the generation, management, and distribution of power in the apparatus 2100.

The multimedia component 2108 includes a screen providing an output interface between the apparatus 2100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 2108 includes a front camera and/or a rear camera. The front camera and the rear camera may receive external multimedia data while the apparatus 2100 is in an operation mode, such as a photographing mode or a video mode. Each of the front camera and the rear camera may be a fixed optical lens system or have focus and optical zoom capability.

The audio component 2110 is configured to output and/or input audio signals. For example, the audio component 2110 includes a microphone (MIC) configured to receive external audio signals when the apparatus 2100 is in an operation mode, such as a call mode, a recording mode, and a voice recognition mode. The received audio signal may be further stored in the memory 2104 or transmitted via the communication component 2116. In some embodiments, the audio component 2110 further includes a speaker for outputting audio signals.

The I/O interface 2112 provides an interface between the processing component 2102 and peripheral interface modules, such as a keyboard, a click wheel, buttons, and the like. The buttons may include, but are not limited to, a home button, a volume button, a start button, and a lock button.

The sensor component 2114 includes one or more sensors to provide status assessments of various aspects of the apparatus 2100. For instance, the sensor component 1407 may detect an on/off status of the apparatus 2100, relative positioning of components, e.g., the display device and the mini keyboard of the apparatus 2100, and the sensor component 2114 may also detect a position change of the apparatus 2100 or a component of the apparatus 2100, presence or absence of user contact with the apparatus 2100, orientation or acceleration/deceleration of the apparatus 2100, and temperature change of the apparatus 2100. The sensor component 2114 may include a proximity sensor configured to detect the presence of nearby objects without any physical contact. The sensor component 2114 may also include a light sensor, such as a CMOS or CCD image sensor, used for imaging applications. In some embodiments, the sensor component 2114 may also include an accelerometer sensor, a gyroscope sensor, a magnetic sensor, a pressure sensor, or a temperature sensor.

The communication component 2116 is configured to facilitate communication, wired or wirelessly, between the apparatus 2100 and other devices. The apparatus 2100 can access a wireless network based on a communication standard, such as WiFi, 2G, or 3G, or a combination thereof. In an exemplary embodiment, the communication component 1408 receives broadcast signals or broadcast associated information from an external broadcast management system via a broadcast channel. In an exemplary embodiment, the communication component 2116 further includes a near field communication (NFC) module to facilitate short-range communications.

In exemplary embodiments, the apparatus 2100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 2104 including instructions, executable by the processor 2120 in the apparatus 2100, for performing the above-described methods. For example, the non-transitory computer-readable storage medium may be a ROM, a RAM, a CD-ROM, a magnetic tape, a floppy disc, an optical data storage device, and the like.

The technical solutions according to the embodiments of the present disclosure may achieve the following beneficial effects:

With the method for transmitting data according to the present disclosure, since an employed frame structure at least includes a configuration mode of an embedded resource, that is, an uplink allocation resource is embedded to a downlink information transmission unit, wherein the uplink allocation resource is configured to bear uplink allocation information of the frame for downlink transmission; and/or a downlink feedback resource is embedded to an uplink information transmission unit, wherein the downlink feedback information is configured to bear HARQ feedback information in the frame. Therefore, by only one schedule transition from downlink to uplink, two complete data transmission processes may be implemented over the data link by using one data frame. With respect to a base station, on the premise of not affecting acquisition of the HARQ feedback information transmitted over downlink data, uplink data may be acquired by only one transition latency. In this way, transmission efficiency of the service data may be entirely improved, particularly, transmission efficiency of high-latency-sensitive service data may be effectively improved, and user experience of the device may be enhanced.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for transmitting data, applied to a base station, the method comprising:
    acquiring downlink control information of a frame to be scheduled, the downlink control information comprising configuration information of an embedded resource of the frame to be scheduled, wherein the frame comprises a plurality of downlink information transmission units, a transition latency, and a plurality of uplink information transmission units;
    scheduling, based on the downlink control information, a downlink information transmission unit to transmit downlink data and uplink allocation information of the frame; and
    acquiring, based on the uplink allocation information, hybrid automatic repeat request (HARQ) feedback information about the transmitting of the downlink data transmitted and uplink data from an uplink information transmission unit, upon the transition latency;
    wherein the embedded resource comprises:
        an uplink allocation resource embedded in last downlink information transmission unit prior to the transition latency and configured to bear the uplink allocation information; and
        a downlink feedback resource embedded in first uplink information transmission unit subsequent to the transition latency and configured to bear the HARQ feedback information about the transmitting of the downlink data.

2. The method according to claim 1, further comprising:
    determining a target frame structure based on a service to be transmitted, wherein the target frame comprises: a downlink data transmission unit, the transition latency, and an uplink data transmission unit.

3. The method according to claim 1, wherein the scheduling, based on the downlink control information, the downlink information transmission unit to transmit downlink data and uplink allocation information of the frame comprises:
    loading the uplink allocation information of the frame to a predetermined downlink allocation resource of a target downlink information transmission unit for transmission; and
    loading the downlink data to be transmitted to a remaining downlink data transmission resource for transmission.

4. The method according to claim 1, wherein the scheduling, based on the downlink control information, the downlink information transmission unit to transmit downlink data and uplink allocation information of the frame comprises:
    loading the uplink allocation information of the frame to a target downlink control information transmission unit for transmission; and
    loading the downlink data to be transmitted to a predetermined downlink data transmission unit for transmission.

5. The method according to claim 1, wherein the acquiring, based on the uplink allocation information, hybrid automatic repeat request (HARQ) feedback information about the transmitting of the downlink data transmitted and uplink data from the uplink information transmission unit, upon the transition latency, comprises:

acquiring the HARQ feedback information about the transmitting of the downlink data from a designated uplink data transmission unit, upon the transition latency; and acquiring the uplink data from a remaining uplink data transmission resource.

6. The method according to claim 1, wherein the acquiring, based on the uplink allocation information, hybrid automatic repeat request (HARQ) feedback information transmitted over the downlink data and uplink data from the uplink information transmission unit, upon the transition latency, comprises:

acquiring the HARQ feedback information about the transmitting of the downlink data from a designated uplink control information transmission unit, upon the transition latency; and acquiring the uplink data from a predetermined uplink data transmission unit.

7. An apparatus for use in data transmission, comprising:
at least one processor; and
a memory for storing instructions executable by the at least one processor;
wherein the at least one processor is configured to:
acquire downlink control information of a frame to be scheduled, the downlink control information comprising configuration information of an embedded resource of the frame to be scheduled, wherein the frame comprises a plurality of downlink information transmission units, a transition latency, and a plurality of uplink information transmission units;
schedule, based on the downlink control information, a downlink information transmission unit to transmit downlink data and uplink allocation information of the frame; and
acquire, based on the uplink allocation information, hybrid automatic repeat request (HARQ) feedback information about the transmitting of the downlink data transmitted and uplink data from an uplink information transmission unit, upon the transition latency;
wherein the embedded resource comprises:
an uplink allocation resource embedded in last downlink information transmission unit prior to the transition latency and configured to bear the uplink allocation information; and
a downlink feedback resource embedded in first uplink information transmission unit subsequent to the transition latency and configured to bear the HARQ feedback information about the transmitting of the downlink data.

8. The apparatus according to claim 7, wherein the at least one processor is further configured to:
prior to the acquire downlink control information of a frame to be scheduled, determine a target frame structure based on a service to be transmitted, wherein the target frame comprises: a downlink data transmission unit, the transition latency, and an uplink data transmission unit.

9. The apparatus according to claim 7, wherein the at least one processor is configured to schedule, based on the downlink control information, the downlink information transmission unit to transmit downlink data and uplink allocation information of the frame by performing acts comprising:
loading the uplink allocation information of the frame to a predetermined downlink allocation resource of a target downlink information transmission unit for transmission; and loading the downlink data to be transmitted to a remaining downlink data transmission resource for transmission.

10. The apparatus according to claim 7, wherein the at least one processor is configured to schedule, based on the downlink control information, the downlink information transmission unit to transmit downlink data and uplink allocation information of the frame by performing acts comprising:
loading the uplink allocation information of the frame to a target downlink control information transmission unit for transmission; and
loading the downlink data to be transmitted to a predetermined downlink data transmission unit for transmission.

11. The apparatus according to claim 7, wherein the at least one processor is configured to acquire, based on the uplink allocation information, hybrid automatic repeat request (HARQ) feedback information about the transmitting of the downlink data transmitted and uplink data from an uplink information transmission unit, upon the transition latency, by performing acts comprising:
acquiring the HARQ feedback information about the transmitting of the downlink data from a designated uplink data transmission unit, upon the transition latency; and
acquiring the uplink data from a remaining uplink data transmission resource.

12. The apparatus according to claim 7, wherein the at least one processor is configured to acquire, based on the uplink allocation information, hybrid automatic repeat request (HARQ) feedback information transmitted over the downlink data and uplink data from an uplink information transmission unit, upon the transition latency, by performing acts comprising:
acquiring the HARQ feedback information about the transmitting of the downlink data from a designated uplink control information transmission unit, upon the transition latency; and
acquiring the uplink data from a predetermined uplink data transmission unit.

13. An apparatus for data transmission, comprising:
at least one processor; and
a memory for storing instructions executable by the at least one processor;
wherein the at least one processor is configured to:
acquire downlink control information, the downlink control information comprising configuration information of an embedded resource of a frame structure, wherein the frame comprises a plurality of downlink information transmission units, a transition latency, and a plurality of uplink information transmission units;
acquire downlink data and uplink allocation information based on the downlink control information;
transmit hybrid automatic repeat request (HARQ) feedback information about the transmitting of the downlink data and uplink data to a base station over an uplink resource indicated by the uplink allocation information, upon the transition latency,
wherein the embedded resource comprises:
an uplink allocation resource embedded in last downlink information transmission unit prior to the transition latency and configured to bear the uplink allocation information; and
a downlink feedback resource embedded in first uplink information transmission unit subsequent to the transition latency and configured to bear the HARQ feedback information about the transmitting of the downlink data.

14. The apparatus according to claim 13, wherein the downlink control information is acquired in at least one of the following ways:
   acquire the downlink control information from a system broadcast signaling;
   acquire the downlink control information from a Radio Resource Control (RRC) upper-layer control signaling;
   acquire the downlink control information from a downlink control information transmission unit at a head of the frame; and
   acquire the downlink control information from a physical-layer control signaling of a physical downlink control channel.

15. The apparatus according to claim 13, wherein the at least one processor is configured to acquire downlink data and uplink allocation information based on the downlink control information by performing acts comprising:
   acquiring the uplink allocation information from a predetermined downlink allocation resource of a target downlink information transmission unit; and
   acquiring the downlink data from a remaining downlink data transmission resource.

16. The apparatus according to claim 13, wherein the at least one processor is configured to acquire downlink data and uplink allocation information based on the downlink control information by performing acts comprising:
   acquiring the uplink allocation information from a target downlink control information transmission unit; and
   acquiring the downlink data from a predetermined downlink data transmission unit.

17. The apparatus according to claim 13, wherein the at least one processor is configured to transmit hybrid automatic repeat request (HARQ) feedback information about the transmitting of the downlink data and uplink data to a base station over an uplink resource indicated by the uplink allocation information, upon the transition latency, by performing acts comprising:
   loading the HARQ feedback information about the transmitting of the downlink data to a downlink feedback resource of a target uplink data transmission unit for transmission, upon the transition latency; and
   transmitting the uplink data to a base station over a remaining uplink data transmission resource.

18. The apparatus according to claim 13 wherein the at least one processor is configured to transmit hybrid automatic repeat request (HARQ) feedback information about the transmitting of the downlink data and uplink data to a base station over an uplink resource indicated by the uplink allocation information, upon the transition latency, by performing acts comprising:
   loading the HARQ feedback information about the transmitting of the downlink data to a predetermined uplink control information transmission unit for transmission, upon the transition latency; and
   transmitting the uplink data to a base station over a predetermined uplink data transmission unit.

* * * * *